(12) United States Patent
Jensen et al.

(10) Patent No.: US 7,729,942 B2
(45) Date of Patent: Jun. 1, 2010

(54) CONSUMER TARGETING METHODS, SYSTEMS, AND COMPUTER PROGRAM PRODUCTS USING MULTIFACTORIAL MARKETING MODELS

(75) Inventors: Kristina Jensen, Atlanta, GA (US); Steve Hoard, Marietta, GA (US); Amy Windom, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 830 days.

(21) Appl. No.: 11/540,361

(22) Filed: Sep. 29, 2006

(65) Prior Publication Data

US 2008/0082411 A1 Apr. 3, 2008

(51) Int. Cl.
*G06Q 30/00* (2006.01)
(52) U.S. Cl. .................. 705/14.52; 705/14.49
(58) Field of Classification Search .................. 705/14, 705/14.49, 14.52
See application file for complete search history.

(56) References Cited

U.S. PATENT DOCUMENTS

| | | | | |
|---|---|---|---|---|
| 5,991,376 A * | 11/1999 | Hennessy et al. | ........ | 379/114.1 |
| 6,185,543 B1 * | 2/2001 | Galperin et al. | ............... | 705/38 |
| 6,408,263 B1 * | 6/2002 | Summers | ....................... | 703/6 |
| 6,640,215 B1 * | 10/2003 | Galperin et al. | ............... | 706/19 |
| 6,873,979 B2 * | 3/2005 | Fishman et al. | ............... | 706/21 |
| 6,925,441 B1 * | 8/2005 | Jones et al. | .................... | 705/10 |
| 6,993,493 B1 * | 1/2006 | Galperin et al. | ............... | 705/10 |
| 7,080,031 B2 * | 7/2006 | Crowe et al. | .................. | 705/35 |
| 7,236,953 B1 * | 6/2007 | Cooper et al. | ............. | 705/36 R |
| 7,328,164 B2 * | 2/2008 | Krikler et al. | .................. | 705/1 |
| 7,343,334 B1 * | 3/2008 | Adduci et al. | ............. | 705/36 R |
| 7,349,838 B2 * | 3/2008 | Summers | ..................... | 703/22 |
| 2002/0169654 A1 * | 11/2002 | Santos et al. | .................. | 705/10 |
| 2002/0194094 A1 * | 12/2002 | Lancaster et al. | ............. | 705/35 |
| 2003/0144907 A1 * | 7/2003 | Cohen et al. | .................. | 705/14 |
| 2003/0200135 A1 * | 10/2003 | Wright | ........................ | 705/10 |
| 2003/0220830 A1 * | 11/2003 | Myr | .............................. | 705/10 |
| 2004/0078796 A1 * | 4/2004 | Utsumi | ....................... | 718/105 |
| 2004/0158473 A1 * | 8/2004 | Contractor | ..................... | 705/1 |
| 2005/0065841 A1 * | 3/2005 | Middleton | .................... | 705/11 |
| 2005/0131791 A1 * | 6/2005 | MacMillan et al. | ........... | 705/35 |
| 2006/0100943 A1 * | 5/2006 | Bennett | ....................... | 705/35 |
| 2006/0200400 A1 * | 9/2006 | Hunter et al. | ............. | 705/36 R |
| 2006/0265342 A1 * | 11/2006 | Froyland et al. | ............ | 705/500 |
| 2007/0118456 A1 * | 5/2007 | Glinberg et al. | ................. | 705/37 |
| 2008/0082411 A1 * | 4/2008 | Jensen et al. | ................. | 705/14 |
| 2008/0262920 A1 * | 10/2008 | O'Neill et al. | ................ | 705/14 |

* cited by examiner

*Primary Examiner*—James W Myhre
*Assistant Examiner*—Adam Chornesky
(74) *Attorney, Agent, or Firm*—Myers Bigel Sibley & Sajovec, P.A.

(57) ABSTRACT

Methods, systems and computer program products target specific consumers for a marketing campaign of goods and/or services by: (a) defining a multi-factorial mathematical model of defined parameters; (b) calculating a numerical value using the multi-factorial mathematical model for respective consumers; then (c) ranking the consumers based on the calculated value associated with the model.

21 Claims, 5 Drawing Sheets

CONSUMER TARGETING METHODS, SYSTEMS, AND COMPUTER PROGRAM PRODUCTS USING MULTIFACTORIAL MARKETING MODELS

FIELD OF THE INVENTION

The present invention relates to targeting customers for marketing campaigns.

BACKGROUND OF THE INVENTION

Conventional customer targeting methods for marketing campaigns have been "hard" rule-based, i.e., include these customers and exclude those customers, based on certain data points, such as, for example, product holdings, propensity to buy scores and other data points. Unfortunately, there are limitations of the conventional approach, which for example, include omitting some customers that should be included and including other customers that may be already over-contacted.

SUMMARY OF THE INVENTION

Embodiments of the invention are directed to systems, methods and computer program products that can select customers to include in marketing campaigns using multi-factorial models with factors or parameters having numerically adjustable constraints and/or weights.

In some embodiments, the mathematical model is able to evaluate expected outcomes and represent each customer outcome with a relative numerical value that is used to rank and select which potential customers to contact.

Some embodiments employ mathematical models that can predict expected outcomes. The model can be used to generate a number for ranking those customers being evaluated and identify which to contact based on their ranking.

Some embodiments are directed to electronic (automated) methods of targeting specific consumers for a marketing campaign of goods and/or services. The methods include: (a) defining a multi-factorial mathematical model of defined parameters associated with expected outcomes; (b) calculating a numerical value using the multi-factorial mathematical model for respective consumers; then (c) ranking the consumers based on the calculated value associated with the model.

In some embodiments, the numerically adjustable factors (numerical ranges and/or weights) can be adjusted based on each specific campaign's target goal(s) in a manner that can increase the total net present value ("NPV") of a campaign over conventional methodologies.

In some particular embodiments, the multi-factorial model may be represented by the equation: NPV=PTR*PTB*(1−PTP)*Expected NPV Margin. In this equation, NPV is an optimized calculated ranking number for net present value, and (a) PTR is a number representing a likelihood to be reached having a numerical constraint in the range between about 3%-98%, (b) PTB is a number representing likelihood to become a gross add (meaning gross addition(s)) for a lead or secondary product or multiple products, having a numerical constraint in the range between about 0.3%-1.17%, (c) PTP is a number representing a likelihood of a propensity to pay having a numerical constraint in the range between about 0.12%-9.87%, and (d) "Expected NPV margin" is a probability number that incorporates data regarding propensity to churn as well as recurring and non-recurring margins. The ranking step can automatically define the finite number of consumers having the highest computed. NPV and automatically electronically select these consumers for targeting.

Other embodiments are directed to systems for targeting consumers for a marketing campaign. The system can include a consumer selection module in communication with a computer network. The consumer selection module can be configured to rank consumers based on a calculated value associated with the mathematical model and select a defined number of consumers having the highest calculated value.

Still other embodiments are directed to computer program products for selecting target consumers for improved marketing campaign results. The products include a computer readable storage medium having computer readable program code embodied therein. The computer readable program code includes: (a) computer readable program code configured to define a multi-factorial mathematical model of defined parameters associated with expected outcomes; (b) computer readable program code configured to calculate a numerical value using the multi-factorial mathematical model for respective consumers; and (c) computer readable program code configured to select the consumers to target based on a ranking generated using the calculated value associated with the model.

Although described above with respect to method aspects of the present invention, it will be understood that the present invention may also be embodied as systems and computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EMBODIMENTS OF THE INVENTION

Figure 1:
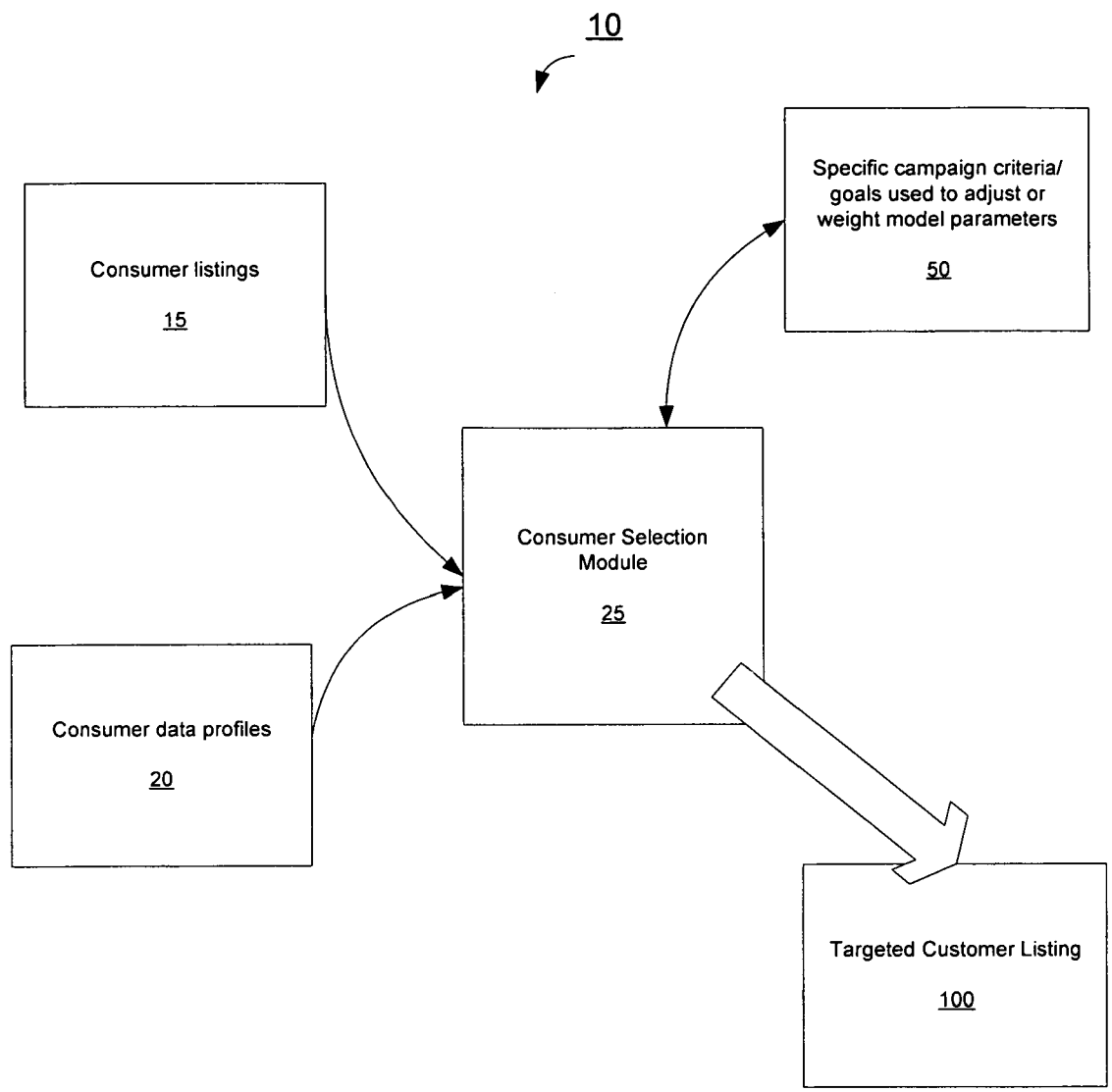
FIG. 1 is a block diagram that illustrates a marketing campaign consumer selection system in accordance with some embodiments of the present invention.

While the invention may be made in modified and alternative forms, specific embodiments thereof are shown by way of example in the drawings and will be described in detail. It should be understood, however, that there is no intent to limit the invention to the particular forms disclosed, but on the contrary, the invention is to cover all modifications, equivalents, and alternatives falling within the spirit and scope of the invention. Like reference numbers signify like elements throughout the description of the figures.

In the figures, the thickness of certain lines, layers, components, elements or features may be exaggerated for clarity. Broken lines illustrate optional features or operations unless specified otherwise. In the claims, the claimed methods are not limited to the order of any steps recited unless so stated thereat.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory.

Generally stated, unlike absolute "include" or "exclude" or hard-rule marketing selection systems, embodiments of the instant invention can allow flexibility and can employ relative ranking systems based on a calculated number from a mathematical model that can evaluate expected outcomes and/or projected consumer behavior. Conventionally, as noted above, not only could consumers be over or under contacted, consumers may not be evaluated across a plurality of different campaigns to assess what an optimal or improved offer may be for a particular consumer (prospective or actual customer). In addition the conventional approach can focus on selecting customers likely to buy only the primary product, not any additional products that a company may be able to sell to that customer as well. In addition, past methods of targeting consumers may focus on acquiring customers without considering negative expected profit based on early churn.

In some embodiments, the targeting system can use a model that can do at least one of the following: (a) consider the number of contacts for each consumer, to inhibit over and under contacting; (b) consider targeting criteria across campaigns so that a respective consumer can receive an offer from the company based on individual behavior/needs; (c) consider targeting criteria based on sales of all company products, rather just a core product in a particular campaign to thereby lift sales for the company rather than a division or other unit; and (d) include targeting criteria that considers expected churn, credit rating, and the like, to increase total NPV of a campaign.

Further the parameter numerical constraints (range criteria) of each or selected parameters in the model can be defined and/or weighted differently for different campaigns allowing for different desired outcomes, while still using the same base mathematical model. For example, in one campaign, rather than optimizing for NPV, gross adds may be the desired goal and the model can be adjusted to optimize this result. Further, for some campaigns, the numerical constraint for NPV can be selected so that a negative NPV may be acceptable for yielding the desired outcome. Thus, in some embodiments, the mathematical model can allow for adjusting the numerical constraints or allow for weighting of factors according to campaign goals.

The term "gross add(s)" refers to new product sales and/or additional product sales. The gross adds parameter can be a numerical projection within a numerical constraint range, and may be based on past campaign results per a respective consumer, or as an average across consumers. The expected gross adds numerical valuation may be based on a consumer specific calculation of a likelihood to become a new customer or buy a new product. The valuation can be generated based on data associated with a consumer having a similar data profile (age, gender, location, credit history, spending profile, vehicle, or computer or cell-phone provider, or other proxy of projected/expected consumer behavior and the like). The past results may be within the company or with a different company.

The term "expected outcome" means that the model can quantify an outcome based on several different consumer specific inputs. The expected outcome can be to optimize NPV, but may be other desired outcomes as well. Thus campaign specific constraints can be defined that allows for the desired outcome. In so doing, the equation can be adjusted, weighted or otherwise modified to generate a ranking number that is used to select customers that does not optimize NPV. For example, a desired outcome may be to maximize the number of new customers or the number of new products, or combinations of same. As such, the numerical constraints and/or weights applied to each or selected factors in the model can be adjusted per campaign. For example, in some situations, a negative NPV may be acceptable.

The term "automated" means carried out programmatically or substantially without requiring manual input. The terms "factors" and "parameters" are used interchangeably to describe components of the mathematical model. The model can be used to generate a ranking of consumers for targeting, which is typically highest to lowest, but can be lowest to highest. The consumers identified can include potential prospective customers and may include current or past customers or non-affiliated consumers. That is, the list of consumers evaluated for potential inclusion in the marketing campaign can include current customers, past customers, customers of third parties or other consumer names obtained either from internal or external media or combinations of the above.

Turning now to the figures, FIG. 1 illustrates a system 10 that can generate a targeted consumer (customer) listing 100. The term "listing" is used in a broad sense and refers to an electronic record(s) that includes some or all the names of targeted consumers, which may be printable in paper form. The listing may also include contact information (address, email, telephone number and the like) thereof. The listing is not required to be a single list nor held in a single transient or permanent electronic storage medium or location. As shown, the system 10 includes a consumer evaluation and selection module 25 that evaluates consumer listings 15 and associated consumer data profiles 20. The consumer evaluation and selection module 25 can include a mathematical model of a plurality of different parameters associated with or relevant to expected outcome(s) of a marketing campaign that can be used to calculate a number for each consumer. A module 50 can be used to input specific campaign criteria and/or goals can be used to adjust numerical ranges and/or weights for one, some or all of the parameters. The module 50 can comprise a portal on a computer that allows a user to enter the numerical adjustments directly and/or may be an automated module that electronically adjusts the numerical values of the model based on user-input marketing goals.

The consumer listing 15 and data profiles 20 are shown in different blocks, representing different databases, modules, servers or systems, but may be in a common database, module, server or system as well. The databases 15, 20 can be remote or local to the module 25. Segments of the data shown in the blocks 15, 20 may reside in one or a plurality of third party computer networks. The consumer data profiles 20 can be created dynamically, evaluated and discarded without electronically saving or may be created and electronically stored. The consumer listings 15 can include names, addresses, ages, and other personal information. The consumer data profiles 20 can include at least a data proxy for evaluating a propensity to pay, such as, for example, credit rating, income, profession, employment status and the like.

In some embodiments, a web portal can be configured to accept user input to define campaign goals and/or adjust numerical ranges or weights for the model that can be used for ranking consumers (not shown).

Figure 2:
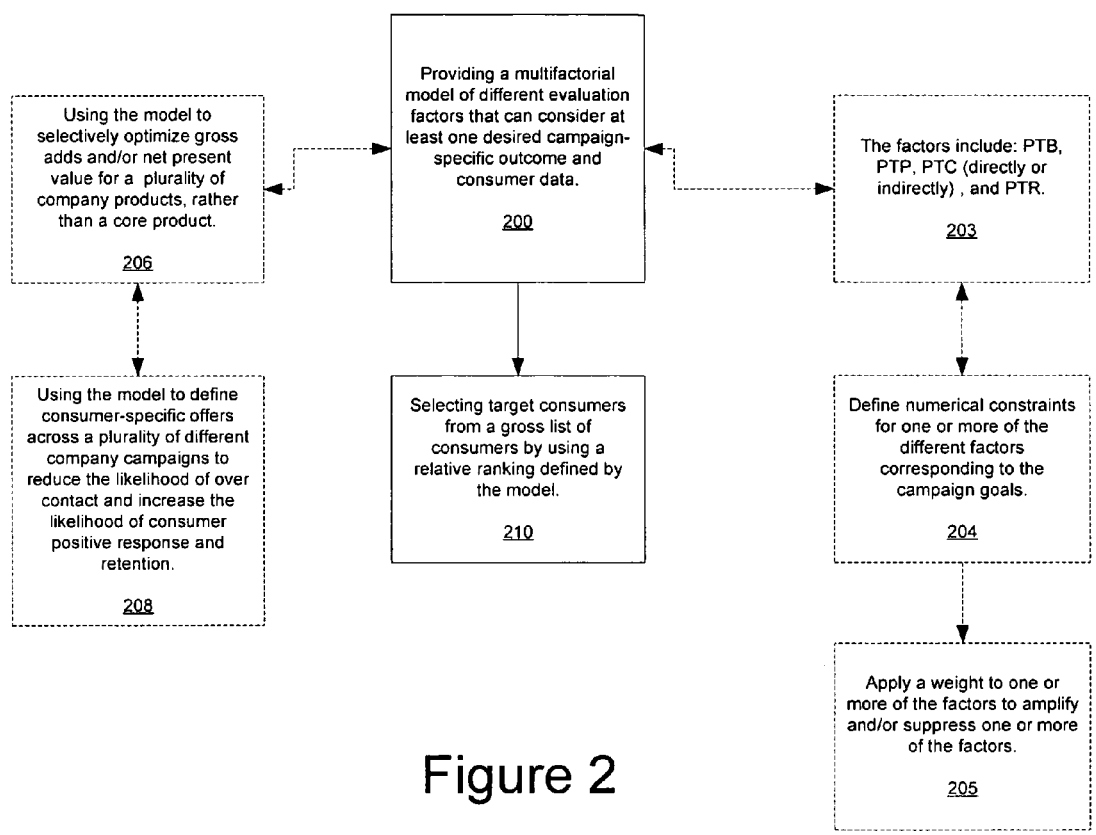
FIG. 2 is a flow chart of exemplary operations for identifying target consumers for optimized campaign results according to embodiments of the present invention.

FIG. 2 illustrates a flow chart of operations that can be used to select target consumers for a marketing campaign(s). As shown, a multi-factorial mathematical model of defined parameters is provided (block 200). The parameters can be associated with consumer data and/or projected outcomes. A numerical value can be calculated using the multi-factorial mathematical model for respective consumers. The target consumers can be selected from a gross list of consumers using a relative ranking of the consumers (block 210). The ranking is based (at least in part) on the calculated value associated with the model.

The mathematical model factors can all be derived from statistical probabilities and can include: (propensity to buy) PTB, (propensity to pay) PTP, (propensity to churn) PTC and (propensity to be reached) PTR (block 203). The propensity to buy can be described as a likelihood of a consumer to become a customer or buy a product (a likelihood to become a "gross add"), and this value may be a relatively small number. The PTC can be included in the model directly or indirectly, such as part of an expected NPV margin as described, for example, with respect to Equation (4). The PTC can be individually calculated to represent a likely consumer retention life for a particular (lead) product and ranges from a high likelihood (short retention life) to a low likelihood (longer retention life). One or more of the numerical constraints for the different factors can be defined or adjusted based on specific campaign goals (block 204). Weights can be applied to one or more of the factors or a factor can be suppressed or omitted to adjust a factor's input on the calculated model number (block 205).

In some embodiments, the mathematical model can be configured to selectively optimize gross adds and/or net present value for a plurality of company products, rather than a core product (block 206). The model can be used to define consumer-specific offers for different products/services of a company (including affiliated companies) across a plurality of different campaigns to reduce the likelihood of over or under contact and/or increase the likelihood of positive consumer response and retention (block 208).

The propensity to buy or purchase score (PTB) is used to estimate the number or percent of buyers to buy and/or a likelihood of a targeted customer to buy. In some embodiments, the PTB for the core product is consumer specific and calculated as a factor separate from other secondary products (the latter of which may include financial margin data for secondary products and historical statistical data of consumer behavior). Historical campaign results can be applied to develop expected take rates. If the campaign is for the outbound telephone marketing ("obtm") channel, the metric can be: total customers who purchased/number of leads reached, else if the campaign is for the direct mail channel, the metric can be: total customers who purchased/number of leads mailed. The propensity to pay (PTP) factor for each customer can be scored with a level of payment based on credit class and, in some embodiments, can be calculated as a percent of write-off of billings. The PTR reflects the propensity to be reached via a channel, such as, for example, obtm (PTR)— each customer can be scored with a percent likelihood to be reached using the reach model and campaign history to quantify expected reach rates and the PTR parameter metric is reaches/leads. The propensity to churn (PTC) can be based on a product churn model reflecting the expected lifetime (typically in months) of a product. PTC values can vary greatly, depending on the product. Models used to define values for factors based on probabilities are well known. For example, exemplary references used in business analysis and data mining include: Multivariate Data Analysis (6th Edition) by Joseph F. Hair, Bill Black, Barry Babin, and Rolph E. Anderson (Hardcover—Oct. 28, 2005); Analyzing Multivariate Data (Duxbury Applied Series) by James Lattin, Douglas Carroll, and Paul Green (Hardcover—Dec. 3, 2002); and Applied Logistic Regression (Wiley Series in Probability and Statistics—Applied Probability and Statistics Section) by David W. Jr. Hosmer and Stanley Lemeshow (Hardcover—Sep. 15, 2000). The Hosmer et al. book is known as a "Gold standard" on Logistic Regression, the most common Predictive technique in Marketing.

In some embodiments, the mathematical model can be represented by the following equation:

$$X = F_1 * F_2 * F_3 \qquad \text{EQUATION (1)}$$

where X is the ranking number, $F_1$ is the first parameter, $F_2$ is the second parameter, and $F_3$ is the third parameter.

$$X = wF_1 * F_2 * F_3 \qquad \text{EQUATION (2)}$$

As shown by Equation (2), one or more of the first, second and third parameters can be individually electronically multiplied by an adjustable weight "w" to thereby increase or decrease the respective parameter's influence on the overall ranking number for a particular campaign. The weight can be a number between about 0.01-10, typically between about 0.5-5. Other weights may be used. The factors can include, for example, at least three of the following: PTR, PTB, PTP and PTC (the PTC number may be considered directly and/or indirectly in the equation). The PTB factor can represent a likelihood to purchase the primary or target product in a campaign.

$$X = F_1 * F_2 * F_3 * F_4 * F_5 \qquad \text{EQUATION (3)}$$

In some embodiments, the mathematical model includes at least five factors, including factors that consider, for example, PTP, PTB, PTR, PTC, and PTM (propensity to buy multiple products). The PTC and PTM components can be one of the noted five factors or can be used as a component of one of the five factors. This approach may allow a business to better manage all these components in a campaign and quantify the expected outcome considering all five components.

Thus, all campaign eligible customers can be scored with the five measures or parameter metrics. For the PTM metric, the propensity to buy multiple products can be based on product profile. A past campaign history can be used to estimate purchases of multiple products. For each core product or product of interest, an eligibility indicator can be set to indicate whether the customer is eligible for that product. The indicator can be set to 1 or 0. If it is set to "1" the customer is eligible for the product, else if it is set "0" the customer is not eligible. So, where there are five possible products, such as, for example, DSL (digital subscriber line), local services, long distance, wireless, and entertainment services (such as, for example, direct TV), each product can be considered separately and its impact on margin calculated. There is no affect on the value if the eligibility for the consumer is "0".

The evaluation can also include an overall campaign eligibility parameter (i.e., flag) where each customer has an indicator by campaign eligibility indicator that is set to 1 or 0 depending on eligibility. If it set to 1 the customer is eligible for the product, else if it is set 0 the customer is not eligible.

In particular embodiments, the mathematical model can be represented by the following equation:

$$NPV = PTR * PTB * (1 - PTP) * \text{Expected NPV Margin}. \qquad \text{EQUATION (4)}$$

NPV is an optimized calculated ranking number for net present value that quantifies an expected outcome and considers multiple metrics. In some embodiments, the PTR factor has a numerical constraint in the range between about 3%-98%. PTR can be based on an actual reach rate based on historical data. PTB is a number representing a likelihood to become a gross add for a lead, secondary or multiple products. Typically the PTB factor represents the likelihood for only for the lead product. In some embodiments, the PTB can have a numerical constraint in the range between about 0.3%-1.17%. In some embodiments, PTB is a gross add for a lead offer that is translated into an expected take rate. The Expected NPV Margin can include PTC data for additional product sales based on past campaign results/historical data of secondary products. In some embodiments, PTP can have a numerical constraint in the range between about 0.12%-9.87%. The 1-PTP value is used in Equation (4), but PTP alone may be used in some particular embodiments. As noted above, PTP can translate a credit class or score into an expected pay rate.

"Expected NPV margin" is a number that incorporates the propensity to churn (PTC), that can be calculated based on a pre-sale churn model that can estimate expected life, and that can include recurring and non-recurring margins associated with the expected life. The Expected NPV margin factor can consider the potential financial contributions of one or multiple secondary products, and include that data if the eligibility factor for a respective product indicates consumer eligibility, i.e., is a "1" rather than "0". The expected NPV margin for the secondary products may be based on a statistical historical number representing a likelihood that a consumer contacted for and/or taking a core product would also take a secondary product. The likelihood can be a number representing an average churn rate across different product/service products (such as, for example, local services, long distance, entertainment services or wireless) or may employ churn rates associated with each particular product/service. The churn value can be for a product lifetime or for lesser time periods. For example, where DSL is a primary or core product, the DSL propensity to churn score can be used for DSL churn while average churn rates can be used for other products.

$$RN = PTR * wPTB * (1 - PTP) * \text{Expected NPV Margin}. \qquad \text{EQUATION (5)}$$

Equation (5) illustrates that the factor PTB may be weighted "w" (greater than 1 or less than 1) to adjust its respective impact on the model ranking number (RN). In addition, the factors can be evaluated alone, decreased, increased, suppressed or omitted according to the business problem/objective. For some embodiments, one or more of the factors in the model can be evaluated alone and customers selected based on constraints associated with an individual factor value as well as the calculated RN associated with the estimated NPV.

In any event, the resultant calculated value of the mathematical model can be used to rank and, thus, define, the finite number of consumers having the highest computed ranking number, in this example, NPV. The marketing selection can be carried out substantially or totally automatically electronically to select the consumers for targeting. The marketing selection system can be configured to: (a) incorporate multiple factors into the expected NPV value; (b) estimate multiple product purchases from one campaign; (c) select a solution that meets both NPV and sales requirements; (d) quantify the outcome rather than applying hard rules; and (5) incorporate other measure(s) of importance if desired.

Tables 1-4 below illustrate exemplary calculations for yielding the estimated NPV value using Equation (4) and considering multiple products.

TABLE 1

Examples of presale churn (PTC) life estimates:

| Decile | Expected LD life |
|---|---|
| Highest 10% | 14.8 |
| 9 | 20.8 |
| 8 | 23.2 |
| 7 | 27.2 |
| 6 | 30.5 |
| 5 | 30.7 |
| 4 | 36.2 |
| 3 | 37.3 |
| 2 | 44.8 |
| Lowest 10% | 50.2 |

Where 31.6 is the average LD life

TABLE 2

Score vs Life

| Score range Decile | Expected DSL Life |
|---|---|
| Highest 10% | 8 |
| 9 | 9 |
| 8 | 9 |
| 7 | 9 |
| 6 | 10 |
| 5 | 12 |
| 4 | 15 |
| 3 | 18 |
| 2 | 22 |
| Lowest 10% | 29 |

TABLE 3

NPV: For purposes of clarifying NPV margin let's assume that there are (5) five products that are being evaluated.

DSL (primary)
CC (complete choice)
LD (long distance)
WLS (wireless)
DTV (Direct TV)

Thus, NPV margin includes five components that can be calculated separately, then summed to provide the cumulative NPV Margin number.

(Expected)NPV=PTB*PTR*(1−PTP)*NPV Margin

NPV Margin:

[[(NPV((recurring margin DSL*PTC)+non-recurring margin)*eligibility flag*likelihood to purchase)]+[(NPV((recurring margin CC*average life)+non-recurring margin)*eligibility flag*likelihood to purchase CC)]+[(NPV((recurring margin LD*average life)+non-recurring margin)*eligibility flag*likelihood to purchase LD)]+[(NPV((recurring margin WLS*average life)+non-recurring margin)*eligibility flag*likelihood to purchase WLS)]+[(NPV((recurring margin DTV*average life)+non-recurring margin)*eligibility flag*likelihood to purchase DTV)]]

The NPV discount used in the NPV margin calculation for each product is a financial metric, typically based on a current interest rate and, in this example, is the same number. The NPV can be calculated using known models, such as, noted below.

NPV=(Mth_cashflow*(1/discount rate)*[1−((1+Discount Rate)^(−life of cash flow))])+non-recurring cashflow By way of example, one assumed yearly discount rate can be 9.00% and the corresponding monthly discount rate is 0.0075.

TABLE 4

For each product (primary and secondary or 'pull through') assume the following values:

| Products | Eligibility flag | Likelihood to Purchase (examples) |
|---|---|---|
| DSL (primary or lead product) | (1/0) | 100% (accounted for with PTB) |
| CC (complete choice) | (1/0) | 50% |
| LD | (1/0) | 30% |
| WLS (wireless) | (1/0) | 5% |
| DTV (Direct TV) | (1/0) | 15% |

Expected NPV=50%*1%*(1-0.12%)*[[(NPV(($17DSL*22months)+(−$200))*1*1)]+[(NPV(($12CC*20months)+(−$50))*1*50%)]+[(NPV(($8LD*35months)+(−$70))*0*30%)]+[(NPV(($10WLS*18)+$80)*0*5%)]+[(NPV(($15DTV*28)+(−$20))*1*15%)]

In some embodiments, the primary or lead product component may be omitted from the NPV margin calculation. Also, the NPV margin factor may be omitted in its entirety in particular applications.

Figure 3:
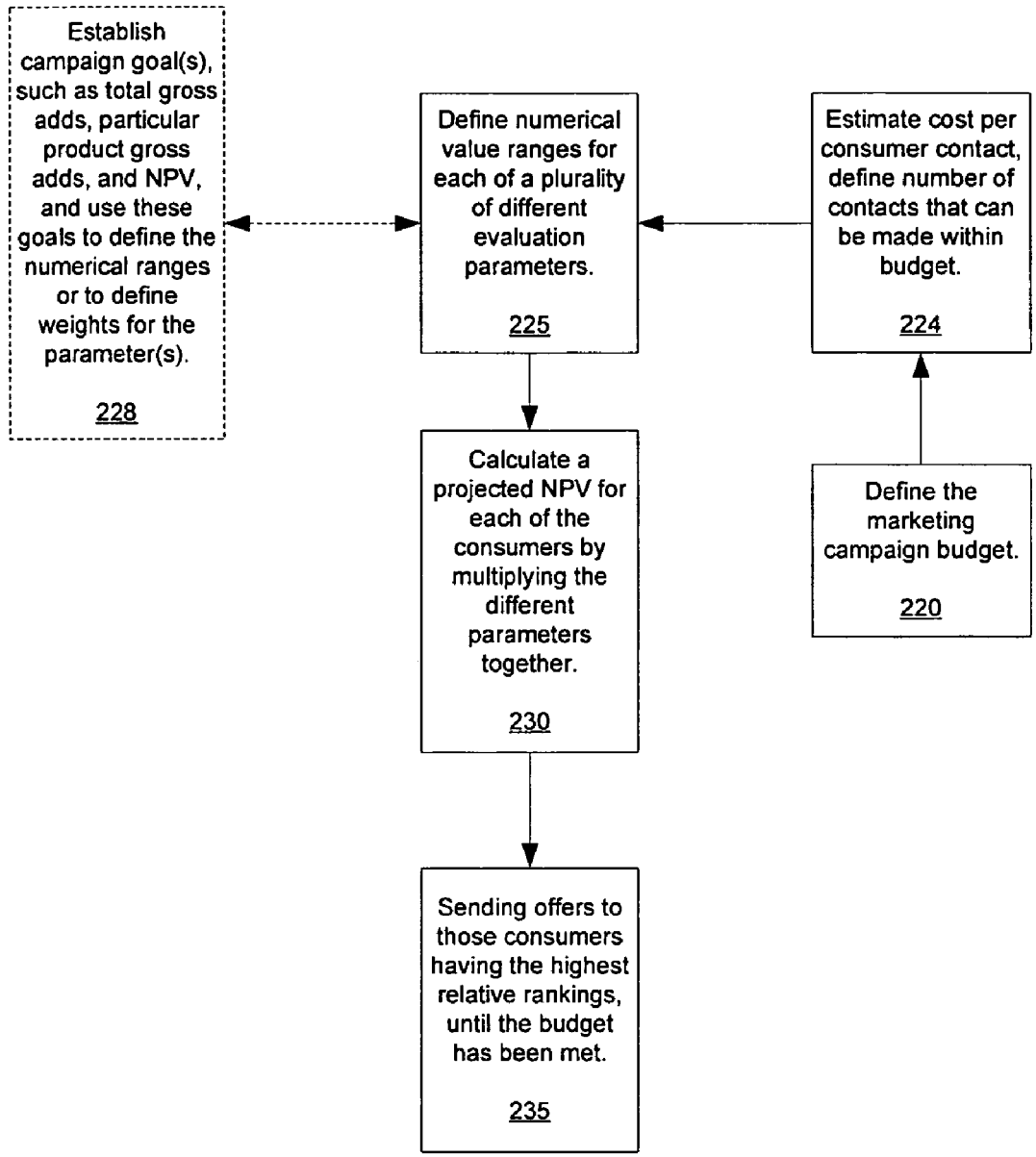
FIG. 3 is a flow chart of exemplary operations for identifying target consumers for optimized campaign results according to embodiments of the present invention.

As shown in FIG. 3, a marketing campaign budget or financial constraint for consumer contact can be defined (block 220). A cost per consumer contact can be estimated to define the number of contacts that can be made within the budget constraint (block 224). Numerical value ranges can be defined for each of the plurality of different evaluation parameters in the mathematical model (block 225). The numerical value ranges can be different for each parameter. A projected NPV (or other desired outcome) can be calculated for each of the consumers by multiplying a value within the numerical value range for each parameter together (block 230). An NPV or other outcome value (e.g., the ranking number) can be generated using the model and the numbers used to rank the consumers. Offers for products/services can be sent to those consumers having the highest relative rankings until the budget has been met (block 235).

In some embodiments, campaign goals can be defined, such as total gross adds, particular product gross adds and/or NPV, and these goals can optionally be used to define the numerical ranges of the parameters and/or to define a weight for at least one of the parameters (block 228).

Figure 4:
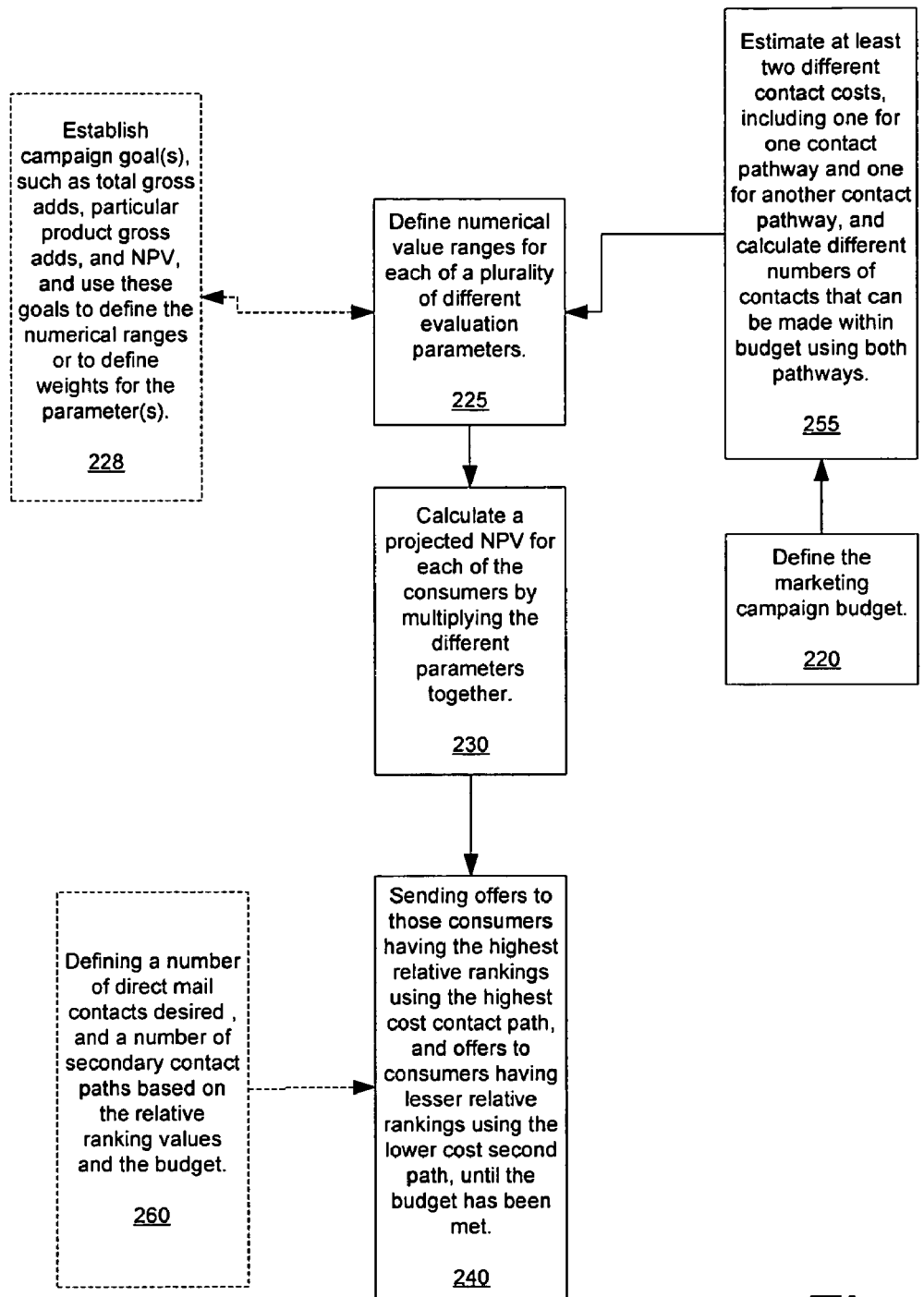
FIG. 4 is a flow chart of exemplary operations for identifying and selecting contact pathways for target consumers according to embodiments of the present invention.

FIG. 4 illustrates some substantially common operations from those shown in FIG. 3, including those operations described with respect to blocks 220, 225, 230 and optional block 228. In this embodiment, at least two different consumer contact pathways can be considered, such as, for example, direct mail and electronic mail or a telephone call and a cost per each established. An NPV or other outcome value can be generated using the model and the numbers used to rank the consumers. Offers can be sent using both pathways, the higher cost pathway being used for the consumers with higher relative rankings and the lower cost pathways being used for consumers having lower relative rankings, the total number of contacts and different contact paths selected and constrained so as to meet the budget (block 240). For example, the number of direct mail contacts can be defined and the number of secondary contact pathways can be defined based on the budget and the number of desired contacts, and the relative ranking values used to define what type of contact (if any) is used for a respective consumer (block 260). In some embodiments, a ranking may be sufficiently high that dual pathways are used for some consumers.

Figure 5:
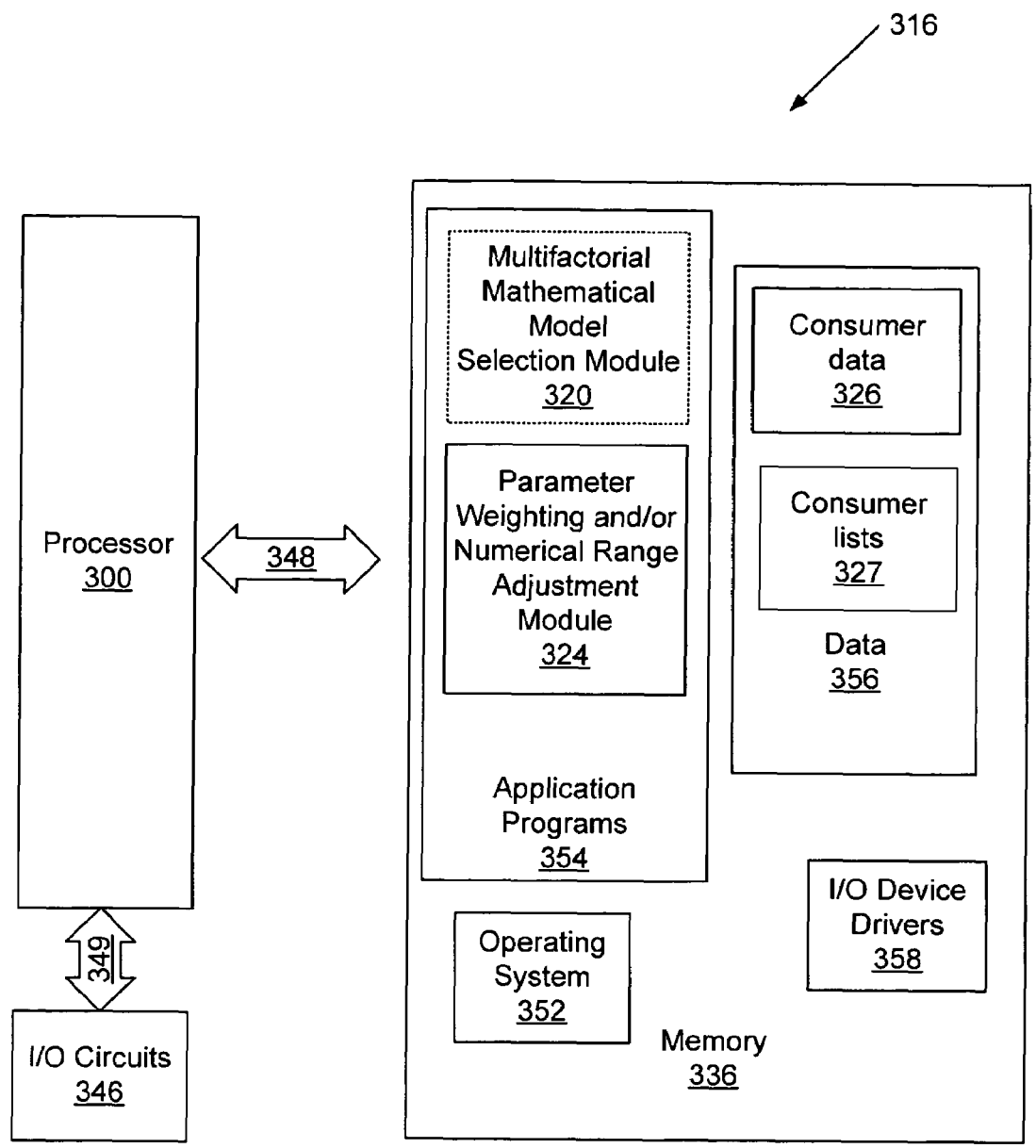
FIG. 5 illustrates a data processing system that may be used to identify target consumers in accordance with some embodiments of the present invention.

Referring now to FIG. 5, a data processing system 316 that may be used to implement the consumer targeting system described herein and/or shown in the figures, in accordance with some embodiments of the present invention, comprises a memory 336 that communicates with a processor 300. The data processing system 316 may further include an input/output (I/O) circuit(s) and/or data port(s) 346 that also communicate with the processor 300. The system 316 may include removable and/or fixed media, such as floppy disks, ZIP drives, hard disks, or the like, as well as virtual storage, such as a RAMDISK. The I/O data port(s) 346 may be used to transfer information between the data processing system 316 and another computer system or a network (e.g., the Internet). These components may be conventional components, such as those used in many conventional computing devices, and their functionality, with respect to conventional operations, is generally known to those skilled in the art.

FIG. 5 illustrates the processor 300 and memory 336 that may be used in embodiments of computer program products or systems in accordance with some embodiments of the present invention. The processor 300 communicates with the memory 336 via an address/data bus 348. The processor 300 may be, for example, a commercially available or custom microprocessor. The memory 336 is representative of the one or more memory devices containing the software and data used in accordance with some embodiments of the present invention. The memory 336 may include, but is not limited to, the following types of devices: cache, ROM, PROM, EPROM, EEPROM, flash, SRAM, and DRAM.

As shown in FIG. 5, the memory 336 may contain up to two or more categories of software and/or data: an operating system 352, I/O Device Drivers 358, data 356 such as consumer data 326 and consumer lists 327, and application programs 354.

As will be appreciated by those of skill in the art, the operating system 352 may be any operating system suitable for use with a data processing system, such as IBM®, OS/2®, AIX® or zOS® operating systems or Microsoft® Windows®95, Windows98, Windows2000 or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 358 typically include software routines accessed through the operating system 352 by the application programs 354 to communicate with devices such as the input/output circuits 346 and certain memory 336 components. The application programs 354 are illustrative of the programs that implement the various features of the circuits and modules according to some embodiments of the present invention. Finally, the data 356 represents the static and dynamic data used by the application programs 354 the operating system 352 the input/output device drivers 358 and other software programs that may reside in the memory 336.

As further illustrated in FIG. 5, according to some embodiments of the present invention, application programs 354 may include a Mathematical Model Selection Module 320 and a Parameter Weighting and/or Parameter Numerical Range Adjustment Module 324. The application program 354 may be located in a local server (or processor) and/or database or a remote server (or processor) and/or database, or combinations of local and remote databases and/or servers.

While the present invention is illustrated with reference to the application programs 354, 324, 325 in FIG. 5, as will be appreciated by those of skill in the art, other configurations fall within the scope of the present invention. For example, rather than being application programs 354 these circuits and modules may also be incorporated into the operating system 352 or other such logical division of the data processing system. Furthermore, while the application program 354 is illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 5 but may be provided by other arrangements and/or divisions of functions between data processing systems. For example, although FIG. 5 is illustrated as having various circuits and modules, one or more of these circuits or modules may be combined or separated without departing from the scope of the present invention.

Although FIG. 5 illustrates exemplary hardware/software architectures that may be used in systems and methods such as shown in FIGS. 1-4, it will be understood that the present invention is not limited to such a configuration but is intended to encompass any configuration capable of carrying out operations described herein. Moreover, the functionality of the data processing systems and the hardware/software architectures may be implemented as a single processor system, a multi-processor system, or even a network of stand-alone computer systems, in accordance with various embodiments of the present invention.

Computer program code for carrying out operations of data processing systems discussed above with respect to the figures may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for administering and/or providing systems that select/identify target consumers for marketing campaigns in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The flowcharts and block diagrams of FIGS. 1-5 illustrate the architecture, functionality, and operations of some embodiments of methods, systems, and computer program products for identifying, ranking and/or selecting target consumers for marketing campaigns. In this regard, each block represents a module, segment, or portion of code, which comprises one or more executable instructions for implementing the specified logical function(s). It should also be noted that in other implementations, the function(s) noted in the blocks might occur out of the order noted. For example, two blocks shown in succession may, in fact, be executed substantially concurrently or the blocks may sometimes be executed in the reverse order, depending on the functionality involved.

The present invention is explained in greater detail in the following prospective non-limiting Examples illustrating the flexibility of the model.

EXAMPLES

A list of consumers that are potential customers is obtained. Financial constraints are such that only a subset of those customers can be contacted. The below table illustrates five different campaigns with different combinations of lead products, contact channels, budget-based contact numbers, campaign specific constraints and contact channels.

| Example # | Acquisition/ Upsell | # Eligible | # Targeted (Budgeted) | Contact channel | Lead product | Supplemental product(s) | Constraint(s) |
|---|---|---|---|---|---|---|---|
| 1 | Upsell | 3M | 1M | Direct Mail | DSL | CC, LD, WLS, DTV | Must acquire DSL subscribers with NPV above X threshold |
| 2 | Upsell | 5M | 500k | OBTM | LD | None | Must acquire 1k gross adds |
| 3 | Upsell | 2M | 1M | Email | CC/BPP | LD | Acquire all with positive NPV |
| 4 | Acquisition | 3M | 2M | Direct Mail | DSL | CC, LD, WLS, DTV | Acquire all with positive NPV |
| 5 | Upsell | 4M | 1M | OBTM | DSL | CC, LD, WLS, DTV | Acquire all with low expected churn (ie customer life of at least one year) |

Example (1) illustrates that of three (3) million eligible potential customers, the budget will allow only one million direct mailings. There is a lead product and a number of supplemental products. The constraint for this campaign is to acquire DSL customers with estimated NPV values above a threshold "X", such as, for example between about $1-$10 (calculated using Equation 4). Thus, those targeted will be the highest calculated estimated NPV values above the threshold value.

Example (2) illustrates that there are five (5) million potential customers and only 500,000 can be contacted via OBTM. There is a lead product but no supplemental products. However, the constraint for this example is 1000 gross adds. Thus, the PTB factor can be calculated for each potential customer and sorted by descending order. This may be sufficient to identify the 500,000 subjects. Alternatively, the entire model (Equation 4) can be used to calculate an estimated NPV for all the potential customers (or at least a subset thereof). Those potentially qualifying under the PTB calculation but having a negative estimated NPV can be discarded—if a positive NPV is desired (which it typically, but not always, is). The estimated NPV can be calculated before or after the PTB calculation. Thus, the list can be presorted by the estimated (positive) NPV value, and those with negative values discarded. Then, the PTB calculation can be used to rank the potential customers likely to yield the gross-adds. Also, because there are no supplemental ("pull through") products, the expected NPV factor in Equation (4) can be calculated based only on the lead product, with contributions from other products set to "0".

Examples (3) and (4) are similar to Example (1) with a constraint that all estimated NPV's are positive. So, instead of a threshold estimated NPV number being the constraint, the estimated NPV need only be positive to qualify, then those with the highest rankings would be selected.

Example (5) illustrates that the constraint can be a low churn (such as an expected customer life of at least one year). As for Example (2), the entire model can be used to calculate the estimated NPV and those with negative numbers discarded. Also, a second ranking can be carried out to determine the potential customers with lower PTC. The PTC value can be calculated using the expected NPV margin factor/model discussed above. Alternatively, a separate PTC value can be calculated using a defined statistical churn model.

It is noted that other constraints, factor rankings, and modifications of the model can be used to select customers for targeting. For example, where gross adds is important, as an alternative to the Example (2) above, the model can be optimized around churn and/or PTB, and the model can be adjusted along the following lines:

$$RN = PTR * w_1 PTB * (1-PTP) * w_2 \text{Expected NPV margin},$$

with heavier weights applied to PTB and/or PTC (the PTC weight can be applied as a subfactor of expected NPV margin or as cumulative expected NPV). Alternatively, the value ranges for PTB and/or PTC can be increased.

In some embodiments, gross adds may be the ultimate campaign goal and negative NPV values may be acceptable, but lower negative NPV values may be unacceptable. The model can be used to determine those with acceptable values.

Some embodiments of the present invention have been illustrated herein by way of example. Many variations and modifications can be made to the embodiments without substantially departing from the principles of the present invention. All such variations and modifications are intended to be included herein within the scope of the present invention, as set forth in the following claims.

That which is claimed:

1. An automated method of targeting specific consumers for a marketing campaign of goods and/or services, comprising:

providing a multi-factorial mathematical model of defined parameters wherein the multi-factorial model is represented by the equation, $$X = F_1 * F_2 * F_3 * F_4 * F_5,$$

where X is a ranking number, $F_1$ is a first parameter that scores a propensity to buy, $F_2$ is a second parameter that scores a propensity to pay, $F_3$ is a third parameter that scores a propensity to be reached, $F_4$ is a fourth parameter that scores at least one propensity to churn, and $F_5$ is a fifth parameter that scores a propensity to purchase multiple products;

calculating a numerical value using the multi-factorial mathematical model for respective consumers; then ranking the consumers based on the calculated value associated with the model, wherein the calculating and ranking are programmatically carried out using at least one computer; and targeting only a subset of the ranked consumers for inclusion in a marketing campaign for defined goods and/or services based on the ranking.

2. A method according to claim 1, further comprising defining a finite number of consumer contacts that can be made based on a financial constraint associated with the marketing campaign, and wherein the targeting step defines which consumers to target based on the ranking and the defined number of consumer contacts.

3. A method according to claim 2, wherein the model defines a constrained range of values for each of the parameters in the multi-factorial model.

4. A method according to claim 2, wherein the multi-factorial model includes at least three parameters, each parameter having a different defined numerical range.

5. A method according to claim 1, wherein the different parameters can be weighted from between about 0.01-10, the weights being electronically adjustable corresponding to campaign goals.

6. A method according to claim 1, wherein each parameter has at least one of numerical constraints or weights that can be electronically adjusted according to campaign-specific goals to thereby reduce or increase a parameters input on a calculated number generated using the mathematical model for the ranking.

7. A method according to claim 6, wherein the numerical constraints for net present value (NPV) can include negative numbers to thereby indicate that NPV is not a primary campaign goal.

8. A method according to claim 1, wherein $F_4$ represents a propensity to churn score with associated recurring and non-recurring margin data.

9. A method according to claim 1, wherein $F_4$ and $F_5$ are combined to generate a score representing an expected financial margin based on churn rates and product/service recurring and non-recurring margins over an estimated life of either a core and secondary products or secondary products alone.

10. A method according to claim 1, wherein $F_4$ is associated with an expected NPV margin that considers both the propensity to churn and recurring and non-recurring margin for at least one product.

11. A method according to claim 1, wherein $F_4$ defines an expected NPV margin that is the sum of a plurality of product-specific NPV margins, each of which includes a value associated with a propensity to churn and a recurring and non-recurring margin for a respective product, multiplied by net present value.

12. A method according to claim 1, wherein $F_5$ scores a propensity to purchase a plurality of the following services: long distance telephone service, wireless cell phone service and digital subscriber line (DSL) service.

13. An automated method of targeting specific consumers for a marketing campaign of goods and/or services, comprising:

providing a multi-factorial mathematical model of defined parameters, wherein the multi-factorial model is represented by the equation:

$$NPV = PTR * PTB * (1-PTP) * \text{Expected NPV Margin},$$

wherein NPV is an optimized calculated ranking number for net present value, wherein (a) PTR is a number representing a likelihood to be reached having a numerical constraint in the range between about 3%-98%, (b) PTB is a number representing a likelihood to become a gross add for a lead, secondary or multiple products, having a numerical constraint in the range between about 0.3%-1.17%, (c) PTP is a number representing a likelihood of a propensity to pay having a numerical constraint in the range between about 0.12%-9.87%, and (d) "Expected NPV margin" is a number representing a propensity to churn and associated recurring and non-recurring margins;

calculating a numerical value using the multi-factorial mathematical model for respective consumers; then ranking the consumers based on the calculated value associated with the model, wherein the calculating and ranking are programmatically carried out using at least one computer; and targeting only a subset of the ranked consumers for inclusion in a marketing campaign for defined goods and/or services based on the ranking, wherein the ranking step automatically defines the finite number of consumers having the highest computed NPV and automatically electronically selects these consumers for targeting.

14. A system for targeting consumers for a marketing campaign, comprising:

a consumer ranking and selection module within a computer network, the consumer selection module configured to rank consumers based on a calculated ranking value associated with the mathematical model and select a defined number of consumers having the highest or lowest relative calculated ranking values, wherein the consumer ranking and selection module is configured to define a mathematical model substantially as represented by the following equation:

$$RN = PTR*PTB*PTC*(1-PTP)$$

where RN is a ranking number, PTR represents a propensity to be reached, PTB represents a propensity to buy a lead product, PTC represents a value that considers a propensity to churn, and PTP represents a propensity to pay.

15. A system according to claim 14, wherein the ranking and selection module is configured to define a mathematical model having a plurality of marketing evaluation parameters, the system further comprising at least one computer having a portal for defining or adjusting weights and/or numerical constraints for parameters associated with the multi-factorial mathematical model.

16. A computer program product for selecting target consumers for improved marketing campaign results, comprising:

a computer readable storage medium having computer readable program code embodied therein, the computer readable program code comprising:

computer readable program code configured to define a multi-factorial mathematical model, wherein the multi-factorial model is represented by the equation $$NPV = PTR*PTB*(1-PTP)*\text{Expected NPV Margin},$$

wherein NPV is an optimized calculated ranking number for net present value, wherein (a) PTR is a number representing a likelihood to be reached having a numerical constraint in the range between about 3%-98%, (b) PTB is a number representing a likelihood of a consumer to become a gross add for a lead product (c) PTP is a number representing propensity to pay having a numerical constraint in the range between about 0.12%-9.87%, and (d) "Expected NPV margin" is a number representing propensity to churn of at least one product and associated financial margins;

computer readable program code configured to calculate a numerical value using the multi-factorial mathematical model for respective consumers;

computer readable program code configured to select the consumers to target based on a ranking generated using the calculated value associated with the model; and computer readable program code configured to define a number of consumer contacts that can be made based on cost per contact and a financial constraint associated with the marketing campaign, and defining which consumers to target based on the ranking and the defined number of consumer contacts.

17. A computer program product according to claim 16, wherein the computer readable program code configured to select is configured to select the defined number of consumer contacts for those consumers ranked as having the highest computed NPV for targeting.

18. A computer program product according to claim 16, Expected NPV margin is defined by calculating a plurality of NPV calculations for a respective plurality of different products or services and summing the plurality of calculated NPVs.

19. A computer program product according to claim 18, wherein the plurality of different products is at least three.

20. A computer program product according to claim 18, wherein the plurality of different products or services is five.

21. A computer program product according to claim 18, wherein the different products or services include a plurality of: long distance telephone service, wireless cell phone service and digital subscriber line (DSL) service.

* * * * *